July 1, 1958 L. P. THOMAS 2,841,646

NOISE CANCELLING SYSTEMS

Filed Aug. 25, 1955 2 Sheets-Sheet 1

INVENTOR.
LUCIUS P. THOMAS
BY
Otto J. Mitchell
ATTORNEY

July 1, 1958 L. P. THOMAS 2,841,646

NOISE CANCELLING SYSTEMS

Filed Aug. 25, 1955 2 Sheets-Sheet 2

INVENTOR.
LUCIUS P. THOMAS
BY
Oliver J. Mitchell
ATTORNEY

United States Patent Office 2,841,646

Patented July 1, 1958

2,841,646

NOISE CANCELLING SYSTEMS

Lucius P. Thomas, West Collingswood, N. J., assignor to Radio Corporation of America, a corporation of Delaware Application August 25, 1955, Serial No. 530,587

4 Claims. (Cl. 178—7.5)

The present invention relates to improvements in television receiving systems and, more particularly, to improved means for increasing the noise immunity of television receiving systems and preventing so-called "lock-out" in certain types of home television receivers which results from noise interference.

In order to improve the noise immunity of home type television receivers use is commonly made of what is termed as a "keyed" type of automatic gain control circuits. This type of automatic gain control circuit in effect samples the incoming television signal during the horizontal synchronizing pulse period and develops a potential which is directly proportional to the amplitude of the video signal at the time it is sampled. The sampling process is accomplished in most receivers by employing the well-known "fly-back" pulse appearing in the horizontal deflection circuit of the receiver. This fly-back pulse is applied to the anode-cathode circuit of the automatic gain control (AGC) tube. Video signal is applied to the control electrode circuit of the AGC tube so that the fly-back pulse may be controllably rectified to produce the required AGC potential for the receiver.

With the above-described keyed AGC system, it is most important that synchronization be established and maintained between the horizontal synchronizing pulse component of the television signal and the horizontal deflection circuit of the receiver. Should missynchronization occur between the received sync and the horizontal deflection circuit, the fly-back pulse applied to the keyed AGC tube will not be in synchronism with the arriving synchronizing pulses. The AGC tube will then react as though the intensity of the received signal level had dropped considerably which will result in substantial increase in the gain of the receiver which in turn will increase the amplitude of the output signal from the video detector by as much as ten times.

If the television receiver employs the well known noise cancellation or noise suicide circuit between the video demodulator and the synchronizing signal separator, the aforementioned "lock-out" of the receiver is likely to occur. This comes about since the cancellation threshold of the noise suicide circuit is generally fixed and established to permit cancellation only of signal excursions having an amplitude exceeding that of the synchronizing signal pulses. Upon a ten to one increase in the signal strength which occurs when missynchronization of the horizontal deflection circuit occurs, normal AGC regulating action is lost and the horizontal synchronizing pulse component may itself be cancelled thereby precluding resynchronization of the horizontal deflection circuit by the received sync pulses. This condition in a television receiver is termed "lock-out."

Therefore, it is an object of the present invention to provide a television receiving system having exceptionally good noise immunity.

It is a further object of the present invention to provide a television receiving system employing a keyed automatic gain control circuit and noise suicide circuit in which the possibility of so-called "lock-out" of the receiver is minimized.

In the realization of the above objects and features of advantage, it is contemplated, in the practice of the present invention, to control the cancellation threshold of a television receiver noise suicide circuit as a function of the maximum peak to peak amplitude of the signal delivered to it by the video demodulator. If a conventional keyed form of automatic gain control (AGC) circuit is employed, missynchronization of the horizontal deflection circuit (from which AGC keying pulses are conventionally derived) will result in a higher signal level at the output of the video demodulator. The threshold of noise suicide circuit operation is proportionately increased to prevent cancellation of the synchronizing component of the delivered video signal thereby preventing deflection circuit "lock-out" by permitting rapid resynchronization of the horizontal deflection circuit.

A better understanding of the present invention as well as other objects and features of advantage may be obtained through a reading of the following specification especially when taken in connection with the accompanying drawing, in which.

Figure 1:
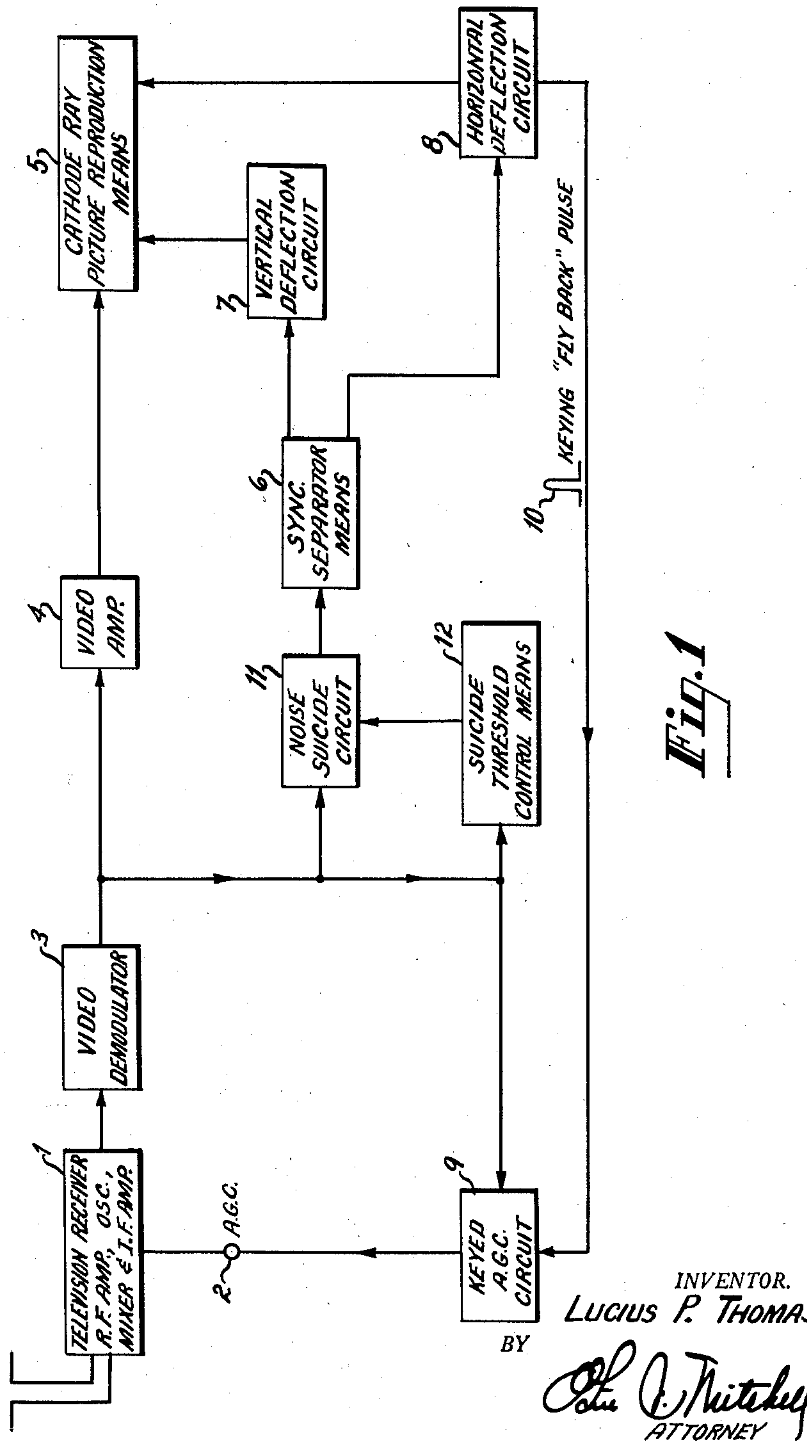
Figure 1 is a block diagram representation showing the general principles underlying the practice of the present invention.

Turning now to Fig. 1, there is indicated at 1 the conventional elements of a television receiver comprising an RF amplifier, superheterodyne mixer and oscillator, and associated intermediate frequency amplifier. The amplifier sections of block 1 are provided with a conventional automatic gain control potential input terminal shown at 2. The intermediate frequency signal delivered by the intermediate frequency amplifier is applied to the video demodulator at 3. Output signal is conventionally applied to a video amplifier 4 which is, in turn, connected in driving relation to a cathode ray beam picture reproducing means 5. Video signal developed by the demodulator 3 is also applied to a conventional sync separator circuit 6, the output signal from which is coupled in controlling relation to the vertical and horizontal deflection circuits 7 and 8 respectively. A keyed automatic gain control circuit 9 is illustrated which employs the fly-back pulse 10 developed by the horizontal deflection circuit 8 as a means for keying the AGC circuit during the horizontal synchronizing pulse period of the received television signals.

In further accordance with conventional practice, the noise cancellation or noise suicide circuit 11 is shown interconnected between the output circuit of the video demodulator 3 and the input of the sync separator circuit 6. The elements thus far described typify the general arrangements of present day home television receivers. Ignoring the threshold control means 12 and its connections which illustrate one form of the present invention, the problem which the present invention aims to overcome will now be considered.

It may be assumed that at some time during the reception of television signals synchronization of the horizontal deflection circuit 8 may be interrupted or momentarily lost due to fortuitous and unwanted occurrence of a prolonged noise burst of the type which exceeds the noise immunity capacity of the sync separator 6 and the horizontal deflection circuit 8. The fly-back pulse 10 will then not occur simultaneously with the synchronizing pulse interval of the received television signal. As a result of this missynchronization, the automatic gain control circuit (AGC) 9 will sample a lower amplitude portion of the received television signal which in turn will result in a change in the value of the gain control potential applied to terminal 2 in a direction which increases the gain of the receiver. This is equivalent to normal AGC action as the result of a decrease in received signal strength. The noise suicide or noise cancellation circuit 11, when conventionally employed, is provided with a fixed cancellation threshold which is related to the amplitude of signal which is delivered by the video demodulator 3 under conditions of normal synchronization when the automatic gain control circuit is operating normally. This noise cancellation threshold is generally established at a level slightly above the amplitude reached by the synchronizing signal component of the demodulated television signal. In this way, the noise cancellation circuit 11 tends to cancel only those noise excursions in the signals which exceed in amplitude the peak value of the synchronizing pulses.

It follows, therefore, that once missynchronization of the deflection circuit 8 occurs with the resultant increase in receiver gain and consequent increase in signal delivered by the video demodulator (an increase as great as ten to one may be expected in practice) the cancellation threshold of the noise cancellation circuit will be exceeded even by video components of the television signal. Consequently, the noise cancellation circuit will act to improperly cancel the synchronizing information otherwise applied to the sync separator 6 and thereby preclude resynchronization of the horizontal deflection circuit 8. This condition is commonly known in the art as television receiver or deflection circuit "lock-out."

In accordance with the present invention the tendency for television receiver "lock-out" as above described is greatly reduced by providing a threshold control means for the noise cancellation or noise suicide circuit. Such a threshold control means is represented by the block 12 in Figure 1. The threshold control means 12 may take a variety of forms as may also the noise suicide or noise elimination circuit 11. According to the present invention, however, the threshold control means 12 develops a threshold control voltage in the noise suicide circuit which is a direct function of the average value of the demodulated video signal delivered by the demodulator 3. In a television receiver this is directly related to the peak to peak value of the television signal applied to the input of the noise suicide circuit. Under conditions leading to television receiver "lock-out," above described, the amplitude of the signal delivered by the video demodulator 3 is so greatly increased that the average value thereof will also increase. This may be sensed by the use of a time constant network, rectifier and filter network as illustrated more fully hereinafter in connection with Fig. 2, to develop a control potential which will change the conduction threshold of one or more amplifier tubes within the noise cancellation circuit. This may be arranged such as to prevent signal cancellation of signal excursions having an amplitude less than the synchronizing pulse component of the television signal at its increased amplitude. Accordingly, synchronizing signal separator 6 will continue to apply synchronizing pulses to the horizontal deflection circuit 8 immediately following any noise disturbance and consequently "lock-out" and continued asynchronism of the horizontal deflection circuit will be prevented.

Figure 2:
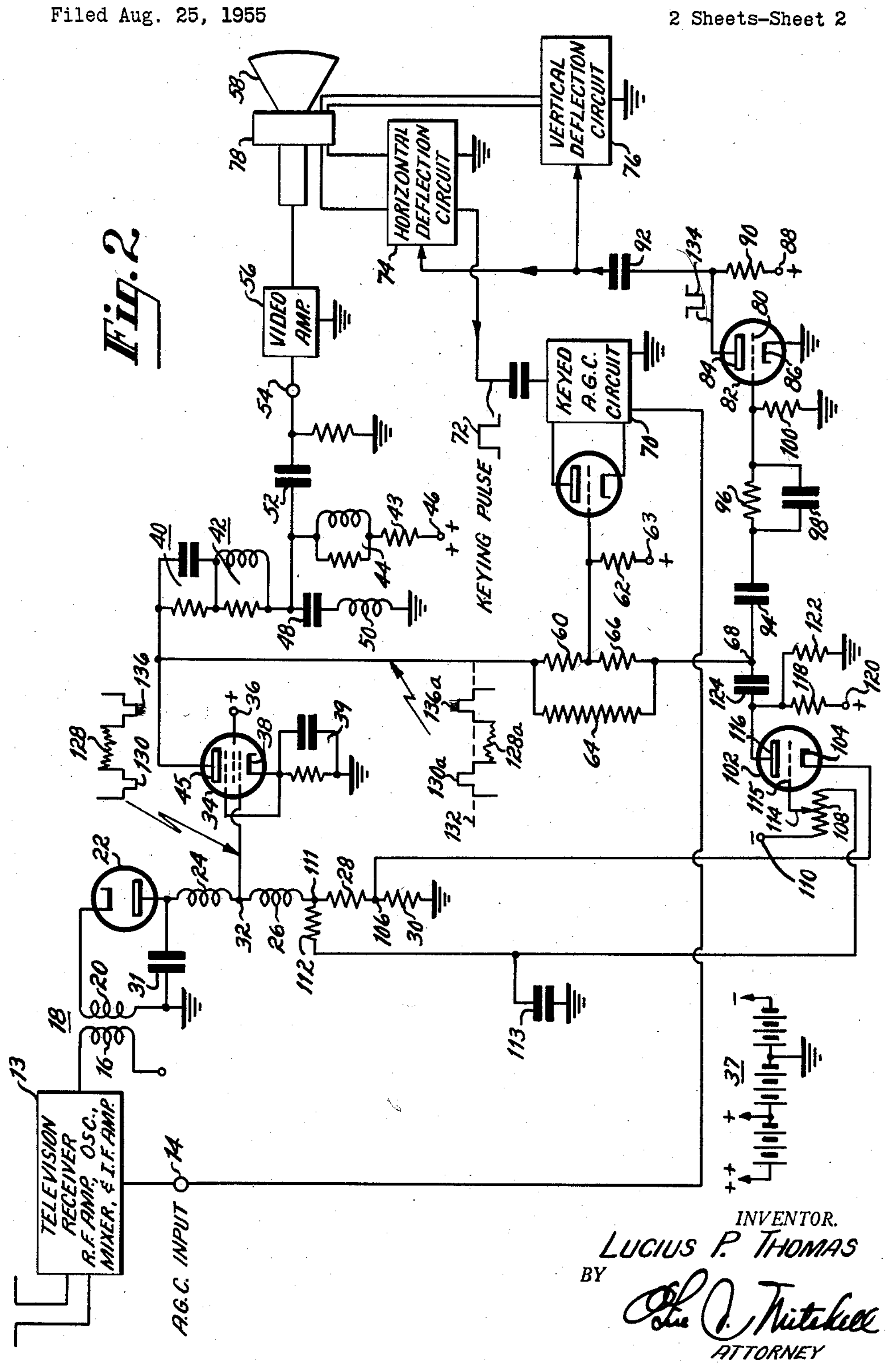
Figure 2 is a combination block and schematic diagram of one form of television receiving system embodying the present invention.

By way of example, a preferred embodiment of the present invention has been shown in Figure 2 in which a television receiver 12 has been shown as supplied with received television signals from an associated antenna. Within the block 13 have been indicated a radio frequency (R. F.) amplifier, an oscillator, a superheterodyne mixer and an intermediate frequency (I. F.) amplifier, all conventional elements of a standard superheterodyne television receiver. An automatic gain control potential input terminal 14 has been indicated for accepting a direct current automatic gain control potential which is applied within the block 13 to one or more amplifiers to control the gain of the overall television receiving system. Output signal from the I. F. amplifier within block 13 is applied across the primary winding 16 of the I. F. transformer 18 for coupling via the secondary winding 20 to the diode demodulator device 22. The lower extremity of the secondary winding is connected with circuit ground. A conventional diode demodulator load circuit comprising the inductor 24, inductor 26, resistor 28, resistor 30 is shown connected from the anode of the diode 22 to circuit ground. A capacitor 31 is connected from the anode of the diode 22 directly to circuit ground to afford a low impedance path for the application of the I. F. signals to the diode 22.

The terminal 32 on the load circuit for the demodulator provides a source of demodulated television signals which is coupled to the control electrode of the video amplifier tube 34. A source of positive potential connected with the screen electrode of the tube 34 is indicated as having a terminal at 36 to establish a pentode operation for the video amplifier. By way of example, a power source has been shown at 37 capable of providing the operating potentials for the circuit as herein described. The cathode 38 of the video amplifier tube 34 is connected through a conventional self-biasing circuit 39 to circuit ground. Conventional frequency selective signal peaking circuits 40, 42 and 44 are connected in series with one another between the anode 45 of the amplifier 34 and a source of positive potential having a terminal at 46. A series combination of capacitor 48 and inductor 50 is provided and is connected from the junction of elements 42 and 44 to circuit ground for attenuating the beat or heterodyne frequency signal produced between the video carrier and the sound carrier being received. The signal developed at the upper terminal of capacitor 48 represents amplified video signal and is capacitively coupled via capacitor 52 to the input terminal 54 of a conventional video output amplifier 56. Signal delivered by the video amplifier 56 is conventionally applied to the kinescope 58 for television picture reproducing purposes.

The particular form of noise cancellation, noise elimination or noise suicide circuit about to be described in connection with the embodiment of the present invention in itself forms no part of the present invention but is described and claimed in copending U. S. patent application, S. N. 512,160, filed May 31, 1955, by Lucius P. Thomas entitled "Television Receiving Systems." In order to accomplish noise cancellation, an auxiliary output branch is provided in the output circuit of the video amplifier 34. This branch comprises the resistor 60 and resistor 62 connected in series to a source of positive potential having a terminal indicated at 63. Potential available at terminal 63 is shown as less than that available at terminal 46 so that the majority of anode current flow to the video amplifier 34 will pass through the peaking elements 40, 42 and 44. In shunt with the resistor 60 is the series combination of resistor 64 and 66, the junction between which is defined at terminal 68. Output signal developed at the output terminal of resistor 62 is direct current (galvanically) connected to the input circuit of a keyed automatic gain control circuit 70 which may be of any conventional form. Keying pulses 72 for the automatic gain control circuit 70 are conventionally derived from the horizontal deflection circuit shown in block form at 74. Both the horizontal deflection circuit 74 and associated vertical deflection circuit 76 are operatively connected to an electromagnetic deflection circuit 78.

The video signal developed at terminal 68 is capacitively coupled to the control electrode 80 of a synchronizing signal separator amplifier device 82 having operating electrodes 84 and 86, respectively, corresponding to a vacuum tube anode and cathode. The anode 84 is connected to a source of polarizing potential having a terminal at 88 through a load resistor 90 across which is developed separated synchronizing (sync) pulses.

The separated sync pulses are capacitively coupled via capacitor 92 to the horizontal and deflection circuits 74 and 76. The video signals applied to the control electrode 80 of the synchronizing signal separator amplifier 82 from the video amplifier are coupled thereto via capacitor 94 and resistor 96. Capacitor 94 in combination with capacitor 98, resistor 96 and resistor 100 constitute a conventional time constant biasing means for the signal separator tube maintaining the tube non-conductive except for signal amplitudes which exceed the well-known blanking level of the received television signals. The bias so developed results from well-known control electrode current conduction in the separator tube 82 attributable to the positive-going excursions of the synchronizing pulses appearing at terminal 68 as hereinafter discussed more fully.

In further accordance with the arrangement shown in Fig. 1, a noise suicide circuit is provided comprising a conventional noise amplifier and signal phase inverting amplifier device 102, the cathode 104 of the device 102 is connected to the point 106 in the television signal demodulator load circuit associated with the diode 22.

In accordance with the present invention, novel biasing means are provided for the tube 102. The biasing means comprise the potentiometer 108 connected between a negative source of potential having a terminal at 110 and a point 111 in the demodulator load circuit. A resistor 112 connects the point 111 with the righthand terminal of the potentiometer 108. Capacitor 113 is connected from the noise suicide circuit extremity of resistor 112 to circuit ground. A movable arm 114 on potentiometer 108 is connected with the control electrode 115 and is adjusted to nominally establish the emplifier 102 in a condition of non-conduction except for signal excursions exceeding the peaks of the demodulated synchronizing pulses. Polarizing potential for the anode 116 of amplifier 102 is provided through a resistance means 118 connected with the positive potential source having a terminal at 120. Resistor 122 is connected between the anode 116 and circuit ground to form a voltage divider in combination with the resistor 118 and, in effect, constitutes a portion of the resistance means constituting the load circuit for the amplifier 102. A capacitor 124 is connected between the anode of the noise amplifier 102 and the terminal 68 in the load circuit of the video amplifier 34.

The operation of the circuit shown in the drawing is substantially as follows. Received television signal is demodulated by the diode 22 to provide a video signal 128 at the terminal 32 of the demodulator circuit. With the particular arrangement shown by way of example, the synchronizing pulse component 130 of the video signal extends in the negative-going direction with respect to circuit ground. The amplified video signal appearing at the anode 45 of the video amplifier 34 will be of such electrical sense that the synchronizing pulse 130 of the waveform 128 will extend in a positive direction as shown by the waveform **128*a*. The output signal 128*a* is capacitively coupled to the sync separator tube 82 which will produce periodical loading on the output load circuit of the video amplifier through the resistors 60, 66 (and 64 connected in shunt therewith) owing to control electrode conduction in the tube 82. The time constant network connected with the control electrode 80, described above, will develop a negative potential on the control electrode as a result of control electrode current flow. By proper choice of the time constant parameters connected with the control electrode 80, a separate bias will be established on the control electrode which will permit conduction in the sync separation tube only for signal excursions exceeding the amplitude of the television signal blanking level 132 indicated in connection with waveform 128*a*. Separated synchronized pulses 134 will, therefore, appear across the load resistor 90 connected in the anode circuit of tube 82**.

Actual cancellation of signal noise is accomplished through the action of noise amplifier tube 102. As described above, the noise amplifier 102 includes threshold biasing means adjustable by the arm 114 to render the noise amplifier conductive only for signals whose amplitudes exceed the peak amplitude of the synchronizing pulse component 130. Thus, the noise excursions 136 will cause the cathode 104 of the triode 102 to swing sufficiently negative with respect to the control electrode 115 to establish conduction in the amplifier 102. In this way only noise excursions will be developed across the noise amplifier output load resistors 118 and 122. The values of the circuit parameters shown are such that the amplitude of noise signal delivered to terminal 68 is equal to or greater than the noise excursions appearing at terminal 68 delivered by the video amplifier 34.

However, should the horizontal deflection circuit drift or, should noise cancellation be incomplete at terminal 68 resulting in missynchronization of the horizontal deflection circuit 74, it will be seen that coincidence will no longer occur between the keying pulse 72 and the synchronizing pulse component **130*a* of signal 128*a*. The AGC circuit 70 will, therefore, develop a potential which is less negative than would otherwise be the case since the keying pulse 72 occurs at a time when the control electrode of the keyed AGC tube is less positive. This will result in the negative potential at terminal 14 swinging in a positive direction (becoming less negative) which will conventionally increase the gain of television receiver 12 and increase the magnitude of demodulated output signal delivered by the diode 22. This action in conventional television receivers of the general type described is found to result in an increase in the amplitude of video signal demodulated by the demodulator 22 of as much as ten times. Thus, the video signal applied to the cathode 104 of the noise suicide tube 102 may be as much as ten times greater than the value of signal appearing at terminal 106 when the automatic gain control circuit is effective to stabilize the video signal amplitude. Manifestly, if no further corrections were applied the noise amplifier inverter tube 102 will conduct on blanking level and synchronizing level excursions. As a consequence, both blanking and sync may be cancelled at terminal 68 resulting in no synchronizing information being delivered to the sync separator tube 82. This prevents the horizontal deflection circuit 74** from pulling in or synchronizing with the received television signal resulting in well-known "lock-out" described above in connection with Figure 1.

In accordance with the particular embodiment of the present invention shown in Figure 2, the right-hand extremity of potentiometer 108 (as shown in Fig. 2) is connected through resistor 112 to the terminal 111 in the diode demodulator circuit as described above. When the signal amplitude delivered by the diode 22 increases substantially, the average D.-C. potential of terminal 111 will increase. After filtering through the time constant network comprising resistor 112 and capacitor 113, this increase in negative potential is communicated to the potentiometer 108 and hence to the control electrode 115. In this way, the threshold of conduction in the noise inverting amplifying tube 102 is increased as a direct function of the signal amplitude delivered by the diode demodulator 22. By properly adjusting the value of resistor 112 and the ratio of the potential available at terminal 111 to the fixed potential applied to the left-hand extremity 110 of potentiometer 108, the control electrode 115 may be made to swing sufficiently negative under conditions leading to "lockout" as to prevent "lockout" from actually occurring.

It will be understood that although one conventional means for changing the conduction threshold on the noise suicide circuit has been illustrated, others will automatically suggest themselves when the principles of the present invention are understood.

Having thus described my invention, what is claimed is:

1. In a television receiver the combination of: means for receiving and demodulating radio television signals; a noise cancellation circuit operatively coupled with said receiving means for cancelling signal components extending beyond a cancellation threshold amplitude by combining said signal components out of phase with another electrical representation of received demodulated television signals in electrical suicide relation thereto, said noise cancellation circuit including signal responsive means for varying the value of said cancellation threshold amplitude; means included in said receiving and demodulating means responsive to the amplitude of received signals to develop a control signal; and means operatively coupling said control signal to said means for varying the value of said cancellation threshold amplitude with such electrical sense as to increase the value of said noise cancellation circuit threshold in response to an increase in the amplitude of signals delivered by said receiving and demodulating means.

2. In a television receiver for receiving and demodulating television signals having at least a video component and a synchronizing component, said synchronizing pulse component representing maximum carrier intelligence excursions of received radio television signals, the combination of: means receiving and demodulating television signals, said receiving and demodulating means including an automatic gain control potential input means for controlling the gain of said receiving means in accordance with a gain control potential; a synchronizing signal separator circuit operatively coupled with said receiving means for separating synchronizing signals from received demodulated television signals; a television picture reproducing means operatively coupled with said receiving means; horizontal and vertical raster scanning means operatively associated with said picture reproducing means for defining a television picture raster; means connecting said scanning means and said separator circuit for synchronization of said scanning means by separated synchronizing component; a keyed automatic gain control potential developing circuit operatively coupled with said receiving means and said horizontal scanning means for developing a gain control potential, which when applied to said receiving means gain control potential input means, increases the gain of said receiving means upon the reduction of received signal strength or the fortuitous missynchronization of said horizontal scanning means by said separated synchronizing signal, said gain control signal otherwise tending to stabilize the amplitude of signal delivered by said receiving means to a substantially fixed desired value over wide ranges of radio signal strength variations; a noise cancellation circuit operatively coupling the output signal from said receiving means to said synchronizing signal separator circuit; an amplitude threshold device included in said noise cancellation circuit restricting signal cancellation to signal excursions extending beyond the peaks of said synchronizing pulses as represented in said stabilized substantially fixed value of demodulated signal delivered by said receiving means; means included in said cancellation circuit for varying said cancellation threshold thereof in accordance with a control potential; means operatively coupled with said receiving means developing a threshold control potential which is a direct function of the signal amplitude delivered by said receiving means; and means coupling said threshold control potential to said threshold varying means with an electrical sense which increases the value of said cancellation threshold in a direction and magnitude preventing cancellation of synchronizing pulse components in said cancellation circuit upon the fortuitous increase in the amplitude of delivered signal from said receiving means above said substantially fixed desired value.

3. In a television system, the combination of: a television receiver including the elements of a radio signal amplifier, demodulator, picture tube, synchronizing signal separator, deflection circuits for said picture tube, a keyed automatic gain control circuit receiving keying pulses derived from said deflection circuits, said receiver elements being operatively connected with on another; a threshold type noise cancellation circuit operatively coupled between said demodulator and said synchronizing signal separator nominally adjusted to cancel all signal excursions applied to said separator exceeding in amplitude the synchronizing component of received television signals as established by the action of said keyed automatic gain control circuit when stabilizing said receiver; cancellation threshold control means operatively connected with said noise cancellation circuit for controlling, in response to a direct current control signal, the signal amplitude level above which noise cancellation is effected; means direct current coupled with said demodulator circuit for developing a control potential the value of which is a direct function of the amplitude of signal delivered by said demodulator; and means direct current connecting said control potential to said threshold control means to increase the cancellation threshold of said noise cancellation circuit as the amplitude of signal delivered by said demodulator increases such that synchronizing signal components of received signals are not cancelled upon fortuitous failure of said automatic gain control circuit to stabilize the amplitude of signal delivered by said demodulator.

4. In a television receiver including the elements of a radio signal amplifier, demodulator, picture tube, synchronizing signal separating, deflection circuits for said deflection tube, a keyed automatic gain control circuit receiving keying pulses from said deflection circuits, said elements being operatively connected with one another; a threshold type noise cancellation circuit operatively coupled between said demodulator and said synchronizing signal separator nominally adjusted to cancel all signal excursions to said separator circuits exceeding in amplitude the synchronizing component of received television signals as established by the action of said keyed automatic gain control circuit; cancellation threshold control means operatively connected with said noise cancellation circuit for controlling, in response to a direct current control signal, the signal amplitude level above which noise cancellation is effected; means included in said receiver coupled to said demodulator circuit responsive to the amplitude of received signals to develop a control potential, the value of which is a direct function of the amplitude signals being received and demodulated; and means direct current connecting said control potential to said threshold control means to increase the canccellation threshold of said noise cancellation circuit as the amplitude of signal delivered by said demodulator increases such that synchronizing signal components of received signals are not cancelled upon fortuitous failure of said automatic gain control circuit to stabilize the amplitude of signal delivered by said demodulator.

References Cited in the file of this patent

FOREIGN PATENTS 1,046,720 France ________________ Dec. 8, 1953